(12) United States Patent
Inomoto et al.

(10) Patent No.: US 7,392,893 B2
(45) Date of Patent: Jul. 1, 2008

(54) POWER UNIT COOLING DEVICE

(75) Inventors: Yutaka Inomoto, Wako (JP); Yoshiaki Tsukada, Wako (JP); Takashi Ozeki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 217 days.

(21) Appl. No.: 11/158,552

(22) Filed: Jun. 22, 2005

(65) Prior Publication Data

US 2006/0032690 A1 Feb. 16, 2006

(30) Foreign Application Priority Data

Aug. 10, 2004 (JP) ............... 2004-233114

(51) Int. Cl.
*F16D 13/72* (2006.01)
*F16H 57/04* (2006.01)
(52) U.S. Cl. .................. 192/113.23; 416/189
(58) Field of Classification Search ........... 192/113.23, 192/113.24, 113.2; 416/55, 60, 169 A, 189, 416/192, 193 R, 186 R, 187, 178, 181, 197 R, 416/90 R, 179, 223 B; 180/229; 123/41.11, 123/41.65, 41.56
See application file for complete search history.

(56) References Cited

U.S. PATENT DOCUMENTS

| 2,945,620 | A | * | 7/1960 | Caddell | .................. | 416/181 |
|---|---|---|---|---|---|---|
| 4,493,677 | A | * | 1/1985 | Ikenoya | .................. | 474/93 |
| 4,928,651 | A | * | 5/1990 | Kronich | .................. | 123/41.56 |
| 5,343,831 | A | * | 9/1994 | Collins | .................. | 123/41.65 |
| 5,387,087 | A | * | 2/1995 | Chen | .................. | 416/179 |
| 6,514,052 | B2 | * | 2/2003 | Bostwick | .................. | 416/189 |
| 7,086,837 | B2 | * | 8/2006 | Kamoshita et al. | .................. | 416/181 |
| 2003/0051697 | A1 | * | 3/2003 | Liu | .................. | 123/196 R |

FOREIGN PATENT DOCUMENTS

JP 58-109762 6/1983

* cited by examiner

*Primary Examiner*—Rodney H Bonck
(74) *Attorney, Agent, or Firm*—Hamre, Schumann, Mueller & Larson, P.C.

(57) ABSTRACT

A centrifugal fan is mounted to an inner plate of a centrifugal clutch as a heat-generating rotating device, and an intake port of a casing is formed near a front side in the axial direction of the centrifugal fan. The centrifugal fan includes a base plate connected to the inner plate of the centrifugal clutch, plural fins formed on the base plate, blow-off holes each formed between arbitrary adjacent fins and extending axially through the base plate, and guide walls for guiding a radially outward air flow over the base plate into the blow-off holes. Air just after admitted from the intake port passes through the blow-off holes and is blown against the centrifugal clutch.

4 Claims, 7 Drawing Sheets

POWER UNIT COOLING DEVICE

CROSS REFERENCE TO RELATED APPLICATIONS

This application claims priority to JP 2004-233114 filed on Aug. 10, 2004.

TECHNICAL FIELD OF THE INVENTION

The present invention relates to a cooling device of an air cooling type which cools the interior of a casing of a power unit with use of an air flow, the power unit being used in a vehicle such as a motorcycle.

BACKGROUND OF THE INVENTION

There is known a motorcycle of the type wherein a drive source such as an engine and a power transmission mechanism such as a clutch and continuously variable transmission are accommodated within a single casing and are mounted as a power unit to a vehicle body frame. Since various devices which generate heat with operation of clutch and transmission are accommodated within the casing of the power unit, it is necessary to cool the interior of the casing efficiently. Therefore, many of power units of this type are provided with a cooling device wherein air is introduced from the exterior of the casing and is allowed to flow through the interior of the casing to effect heat exchange.

A conventional cooling device is known wherein a centrifugal fan is mounted to a driving pulley in a belt type continuously variable transmission, air introduced from an intake port of a casing is fed into the casing by a radially outward blow-off action of the centrifugal fan, and heat-generating rotating devices such as continuously variable transmission and clutch are cooled by a flow of the air (see, for example, Japanese Patent Laid Open No. Sho 58-109762).

However, according to the structure of the above conventional cooling device, the introduced air is allowed to flow through the interior of the casing by the radial blow-off action of the centrifugal fan, so when a heat-generating rotating device such as clutch is spaced very far from a rotary shaft of the centrifugal fan, it is difficult to cool the device efficiently. That is, when a heat-generating rotating device to be cooled is spaced very far from a rotary shaft of the centrifugal fan, the introduced air is warmed by another heat-generating device while flowing through the interior of the casing and its heat-exchanging capacity is deteriorated upon arrival at the desired heat-generating device. Further, the centrifugal fan, due to characteristics thereof, cannot perform direct sending of air even when disposed coaxially with a heat-generating rotating device. In using the above conventional cooling device, therefore, it is required in many cases that the centrifugal fan and the heat-generating rotating device to be cooled be spaced away from each other.

Accordingly, it is an object of the present invention to provide a power unit cooling device capable of efficiently cooling a heat-generating rotating device to be cooled which is disposed within a casing.

SUMMARY OF THE INVENTION

In order to achieve the above-mentioned object, there is provided a power unit cooling device wherein a centrifugal fan (e.g., a centrifugal fan 54 in an embodiment to be described later) is disposed within a casing of a power unit (e.g., a power unit 11 in the embodiment to be described later) which accommodates a power source and a power transmission mechanism, and air introduced from an axially front side of the centrifugal fan is allowed to flow through the interior of the casing by a blow-off action of the centrifugal fan, characterized in that the centrifugal fan mounted on a rotary shaft of a heat-generating rotating device (e.g., a centrifugal clutch 40 in the embodiment to be described later) which generates heat during operation, a flow dividing mechanism (e.g., a blow-off hole 88 and a guide wall 89 in the embodiment to be described later) for dividing a part of an air flow blown off radially outward to an axially back side is provided in the centrifugal fan, and an intake port (e.g., an intake port 59a in the embodiment to be described later) of the casing is disposed near an axially front side of the centrifugal fan.

According to this construction, air introduced from an intake port of the casing is sucked in by the centrifugal fan and part of an air flow created by the centrifugal fan is blown off radially outward as it is, while the remaining air flow is blown off axially backward by the flow dividing mechanism. At this time, the air introduced from the intake port flows through the flow dividing mechanism into the heat-generating rotating device located on the rear side of the centrifugal fan.

The centrifugal fan may comprise a base plate (e.g., a base plate 86 in the embodiment to be described later) integrally connected to the rotary shaft of the heat-generating rotating device, a plurality of fins (e.g., fins 87 in the embodiment to be described later) formed on an outer periphery edge of the base plate, a blow-off hole (e.g., a blow-off hole 88 in the embodiment to be described later) formed axially through the base plate in a position between arbitrary adjacent ones of the fins on the base plate, and a guide wall (e.g., a guide wall 89 in the embodiment to be described later) formed between the adjacent fins to conduct air flowing radially outward over the base plate into the blow-off hole. According to the centrifugal fan of this construction, when the base plate rotates together with the rotary shaft of the heat-generating rotating device, air introduced from the front side of the base plate is blown off radially outward by the action of the fins. At this time, between the fins located on both sides of the guide wall, the flow flowing radially outward is guided by the guide wall and is blown off to the rear side of the centrifugal fan from the blow-off hole formed through the base plate.

The heat-generating rotating device is particularly effective in the case where it is a centrifugal clutch which, when the number of revolutions of an inner rotor (e.g., an inner plate 40b in the embodiment to be described later) connected to the power source side has reached a predetermined number of revolutions, transmits a rotating power to an outer rotor (e.g., an outer case 40a in the embodiment to be described later) connected to a driven side. That is, since the air introduced from the intake port of the casing is introduced directly into the centrifugal clutch through the flow dividing mechanism in the centrifugal fan, it is possible to prevent an increase in temperature of the centrifugal clutch even in such an interior layout of the casing as makes it difficult to ensure a sufficient heat capacity.

Preferably, an inlet port (e.g., an inlet port 91 in the embodiment to be described later) for conducting air blown-off from the blow-off hole of the centrifugal fan into the centrifugal clutch and a discharge port (e.g., a discharge port 92 in the embodiment to be described later) for discharging the air to the exterior of the clutch are formed in the centrifugal clutch. In this case, the air blown off from the blow-off hole of the centrifugal fan passes through the inlet port of the centrifugal clutch and is introduced into the clutch, then passes through the discharge port and is discharged smoothly to the exterior of the clutch.

In the case where the centrifugal clutch is interposed between an input side of the power transmission mechanism, which is for transmitting engine power to a driving wheel, and an engine crank shaft, it is preferable to adopt a construction wherein the centrifugal fan is mounted on an input side of the centrifugal clutch, and the air blown off radially outward by the centrifugal fan is fed to the interior of the casing, while the air flowing axially backward as a divided air flow from the centrifugal fan is fed to the interior of the centrifugal clutch. According to this construction, the power transmission mechanism and the centrifugal clutch in the casing are sure to be cooled. Further, since the centrifugal fan is mounted on the input side of the centrifugal clutch, the interior of the casing is sure to be cooled also during a low-speed operation of the engine during which the transfer of power from the crank shaft to the power transmission mechanism is cut off.

In one embodiment of the invention, the power transmission mechanism is, for example, a belt type continuously variable transmission.

In an embodiment of the invention, not only the air sucked in from near the intake port of the casing is blown off radially outward by the centrifugal fan, but also a portion thereof can be flown off directly through the flow dividing mechanism toward the heat-generating rotating device disposed to the rear of the centrifugal fan, so that the desired heat-generating rotating device located within the casing can be cooled efficiently.

In an embodiment of the invention, air can be blown off positively to the rear of the centrifugal fan by the flow dividing mechanism which comprises the guide wall and the blow-off hole both formed on the base plate, so that it is possible to attain the reduction in size of the centrifugal fan and reduction of the manufacturing cost.

In an embodiment of the invention, an increase in temperature of the centrifugal clutch can be prevented even in an internal layout of the casing which is difficult to ensure a sufficiently large heat capacity of the centrifugal clutch, so that it becomes possible to enhance the layout freedom for the centrifugal clutch within the casing.

In an embodiment of the invention, the air blown off from the blow-off hole of the centrifugal fan blows smoothly through both inlet port and discharge port of the centrifugal clutch, so that not only the cooling efficiency for the centrifugal clutch can be further enhanced, but also wear dust generated within the clutch can be discharged smoothly to the exterior.

In an embodiment of the invention, not only both power transmission mechanism and centrifugal clutch within the casing can be cooled by the air blown off from the centrifugal fan, but also the power transmission mechanism and the centrifugal clutch can surely be cooled also during idling during which engine power is not transmitted to the power transmission mechanism.

In an embodiment of the invention, a belt type continuously variable transmission which is apt to generate frictional heat can be cooled efficiently together with the centrifugal clutch.

An embodiment of the present invention will be described hereinunder with reference to the drawings.

DETAILED DESCRIPTION OF THE PREFERRED EMBODIMENT

In the following description, the front side indicates a vehicle advancing direction, and the right side and the left side indicate the right and left, respectively, in the vehicle advancing direction.

Figure 1:
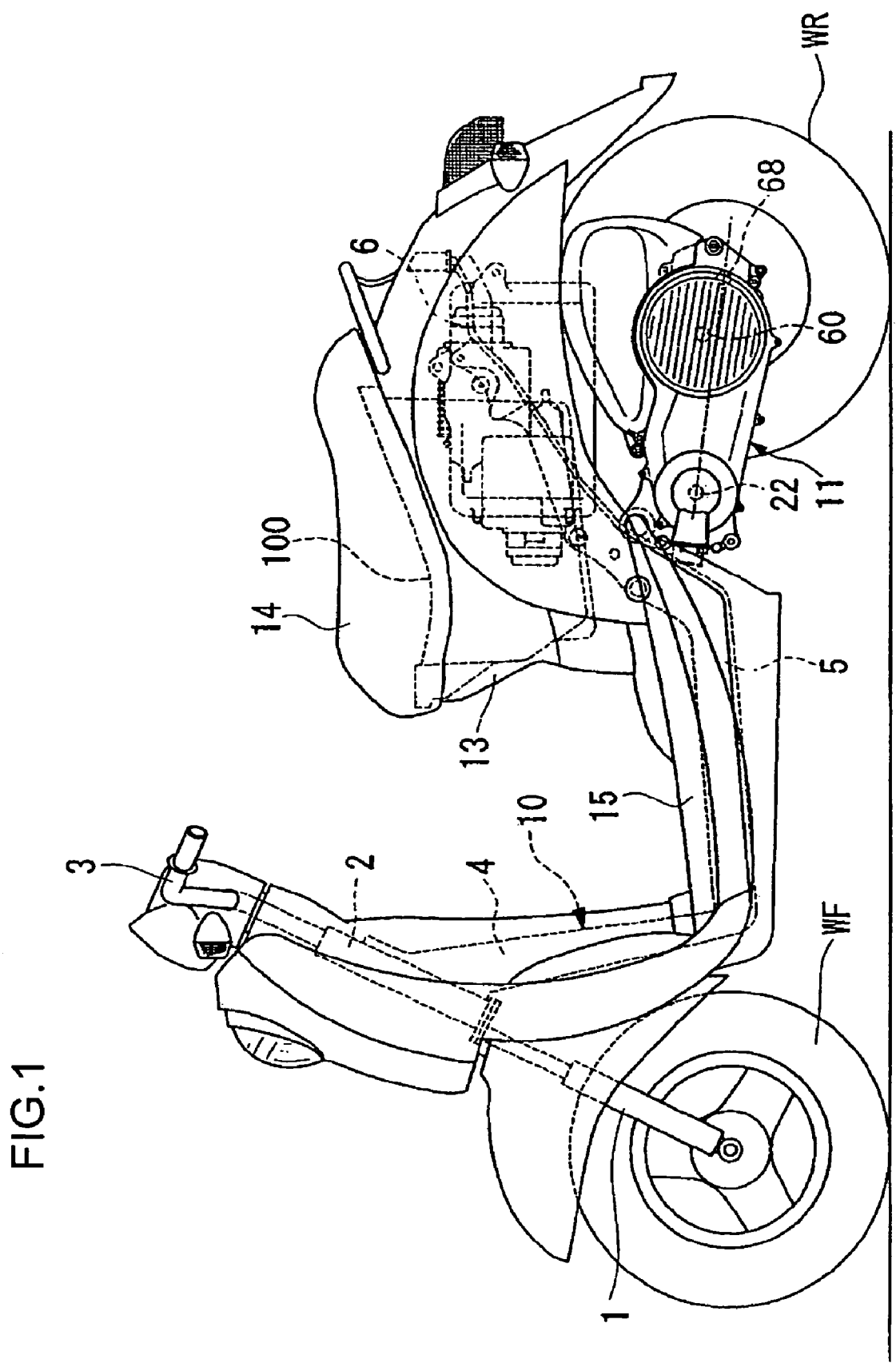
FIG. 1 is a side view of a hybrid motorcycle according to an embodiment of the present invention.

In this embodiment a power unit cooling device according to the present invention is applied to a hybrid motorcycle. As shown in FIG. 1, the motorcycle related to this embodiment is what is called a scooter type vehicle, in which a power unit 11 including a power source is a unit swing type and is supported swingably by a body frame 10 together with a rear wheel WR. On a front side of the vehicle body is provided a front fork 1 which supports a front wheel WF through an axle. The front fork 1 is supported rotatably by a head pipe 2 which constitutes a part of the body frame 10. An upper end of the front fork 1 is connected to a handle 3 and the vehicle can be steered by operation of the handle 3. A down pipe 4 extending in a backwardly downward direction is attached to the head pipe 2, and an intermediate frame 5 extends nearly horizontally from a lower end of the down pipe 4. Further, a rear frame 6 extending in a backwardly upward direction is connected to a rear end of the intermediate frame 5. The body frame 10 includes the head pipe 2, down pipe 4, intermediate frame 5 and rear frame 6 as principal elements.

The body frame 10 is covered with a body cover 13 and a rider seat 14 is fixed to a nearly central, upward expanded portion of the body cover 13. In front of the seat 14 is formed a step floor 15 for the rider to put his or her feet thereon, the step floor 15 being formed lower than the seat 14. A luggage box 100 which functions as a utility space for accommodating, for example, helmet or other goods is provided under the seat 14.

A schematic construction of the power unit 11 will now be described with reference to FIG. 2. The power unit 11 comprises an engine 20 as a first power source, an ACG starter motor 21*a* which functions not only as a starter for starting the engine 20 but also as a generator, a continuously variable transmission 23 which converts the power of the engine 20 into a transmission gear ratio proportional to the engine speed and then transmits the power to the rear wheel WR, a centrifugal clutch 40 (starting clutch) interposed between the engine 20 and the continuously variable transmission 23 to cut off the transmission of power, a one-way clutch 44 which transmits power from the continuously variable transmission 23 to the rear wheel WR but does not transmit power from the rear wheel WR to the continuously variable transmission 23, a reduction mechanism 69 disposed between a rear wheel WR-side output portion (driven shaft 60) of the one-way clutch 44 and an axle 68 (see FIG. 3) of the rear wheel WR to reduce the output to be transmitted to the rear wheel WR, and a drive motor 21*b* connected to an input side of the reduction mechanism 69 and functioning not only as a motor which is a second power source but also as a generator.

The power unit 11 has basically two drive systems. One drive system transmits power of the engine 20 to the rear wheel WR via the centrifugal clutch 40, continuously variable transmission 23, one-way clutch 44, driven shaft 60 and reduction mechanism 69, while the other drive system transmits power of the drive motor 21b to the rear wheel WR via the driven shaft 60 and the reduction mechanism 69.

A battery 74 is connected to the ACG starter motor 21a and the drive motor 21b. When the motors 21a and 21b function as starters or motors, electric power is fed from the battery 74 to the motors 21a and 21b, while when the motors 21a and 21b function as generators, their regenerated power is charged into the battery 74.

Control of the engine 20, ACG starter motor 21a and drive motor 21b is performed by a control unit 7 as control means.

According to the construction of the engine 20, an air-fuel mixture is sucked in from an intake pipe 16 and is burned, and a throttle valve 17 for controlling the amount of air is disposed pivotably within the intake pipe 16. The throttle valve 17 is adapted to pivot in accordance with the amount of operation of a throttle grip (not shown) which is operated by the rider. An injector 18 for the injection of fuel and a negative pressure sensor 19 for detecting a negative pressure within the intake pipe are disposed between the throttle valve 17 and the engine 20.

Figure 3:
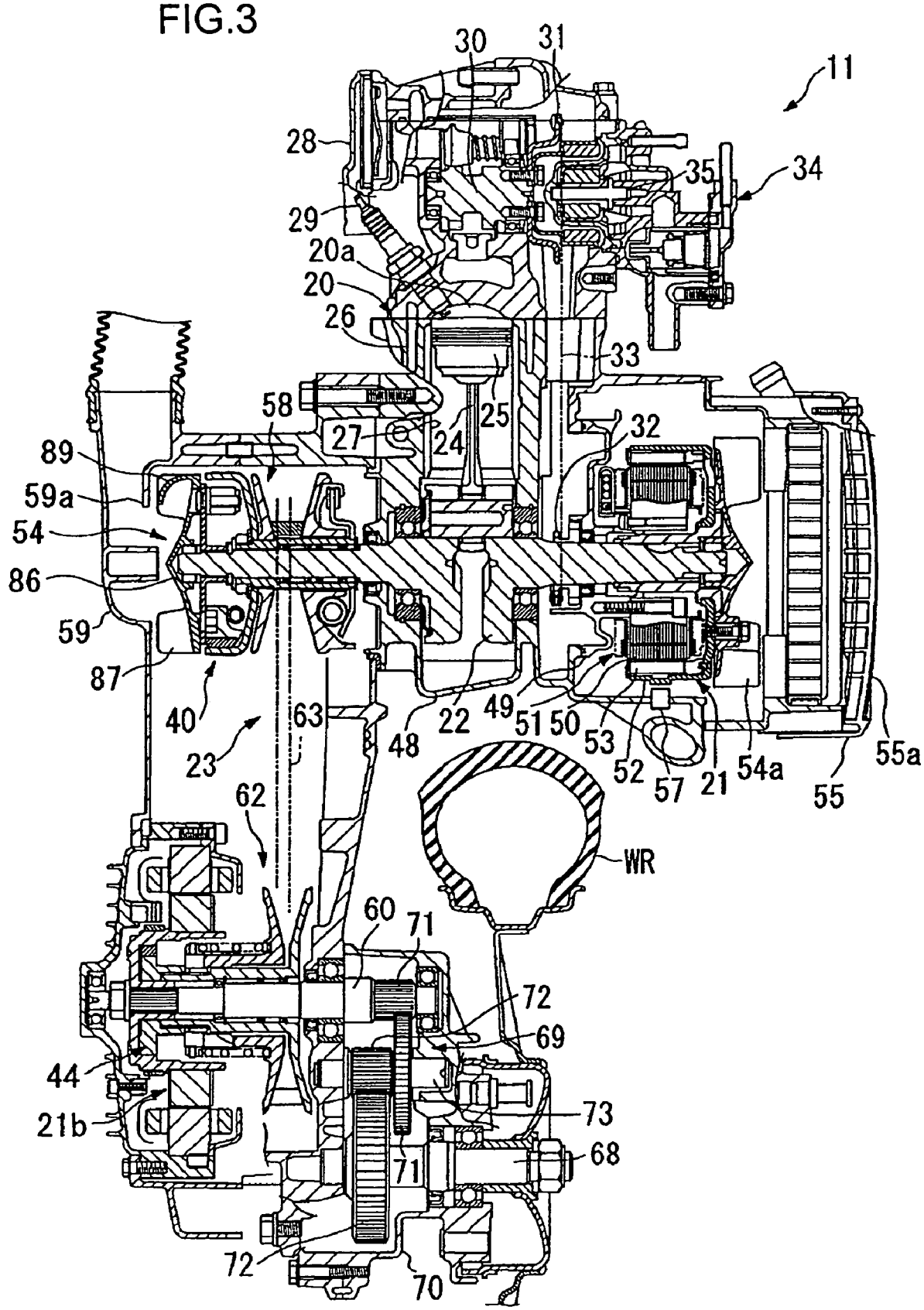
FIG. 3 is a sectional view of a power unit in the motorcycle of FIG. 1.

Next, a concrete construction of the power unit 11 will be described with reference to FIG. 3.

In the engine 20, a piston 25 is slidably received within a cylinder 27 of a cylinder block 26, and a crank shaft 22 is connected to the piston 25 through a connecting rod 24. The cylinder block 26 is disposed so that the axis of the cylinder 27 becomes substantially horizontal, and a cylinder head 28 is fixed to the head portion of the cylinder block 26 so as to close one end of the cylinder 27. A combustion chamber 20a for combustion of the air-fuel mixture is formed between the cylinder head 28 and the piston 25.

A valve (not shown) for controlling the intake or exhaust of the air-fuel mixture to or from the combustion chamber 20a, as well as a spark plug 29, are disposed in the cylinder head 28. Opening and closing of the valve are controlled by rotation of a cam shaft 30 which is supported by the cylinder head 28. The cam shaft 30 is provided on one end side thereof with a driven sprocket 31, and an endless cam chain 33 is stretched between and entrained on the driven sprocket 31 and a driving sprocket 32 mounted on one end of the crank shaft 22. The cam shaft 30 is interlocked with rotation of the crank shaft 22 through the cam chain 33. A water pump 34 for cooling the engine 20 is provided at one end of the cam shaft 30.

The water pump 34 is mounted so that a rotary shaft 35 thereof rotates together with the cam shaft 30. Therefore, the water pump 34 can be operated with rotation of the cam shaft 30.

A stator case 49 is connected to the right side in the vehicular width direction of a crank case 48 which supports the crank shaft 22, and the ACG starter motor 21a is accommodated within the stator case 49. The ACG starter motor 21a is a so-called outer rotor type motor, and a stator thereof comprises a coil 51 formed by winding a conductor around teeth 50 fixed to the stator case 49. On the other hand, an outer rotor 52 is fixed to the crank shaft 22 and has a generally cylindrical shape which covers the outer periphery of the stator. A magnet 53 is disposed on an inner periphery surface of the outer rotor 52.

A centrifugal fan 54a for cooling the ACG starter motor 21a is attached to the outer rotor 52. As the centrifugal fan 54a rotates in synchronism with the crank shaft 22, the outside air is introduced from a cooling air intake port formed in a side face 55a of a cover 55 of the stator case 49.

A driving pulley 58 in the continuously variable transmission 23 is mounted through the centrifugal clutch 40 onto a left end portion of the crank shaft 22 which projects in the vehicular width direction from the crank case 48.

The continuously variable transmission 23 includes the driving pulley 58 mounted on the crank shaft 22, a driven pulley 62 mounted through the one-way clutch 44 onto the driven shaft 60 which has an axis parallel to the crank shaft 22, and an endless V belt 63 entrained on both driving pulley 58 and driven pulley 62 to transmit a rotating power from the former to the latter.

Figure 5:
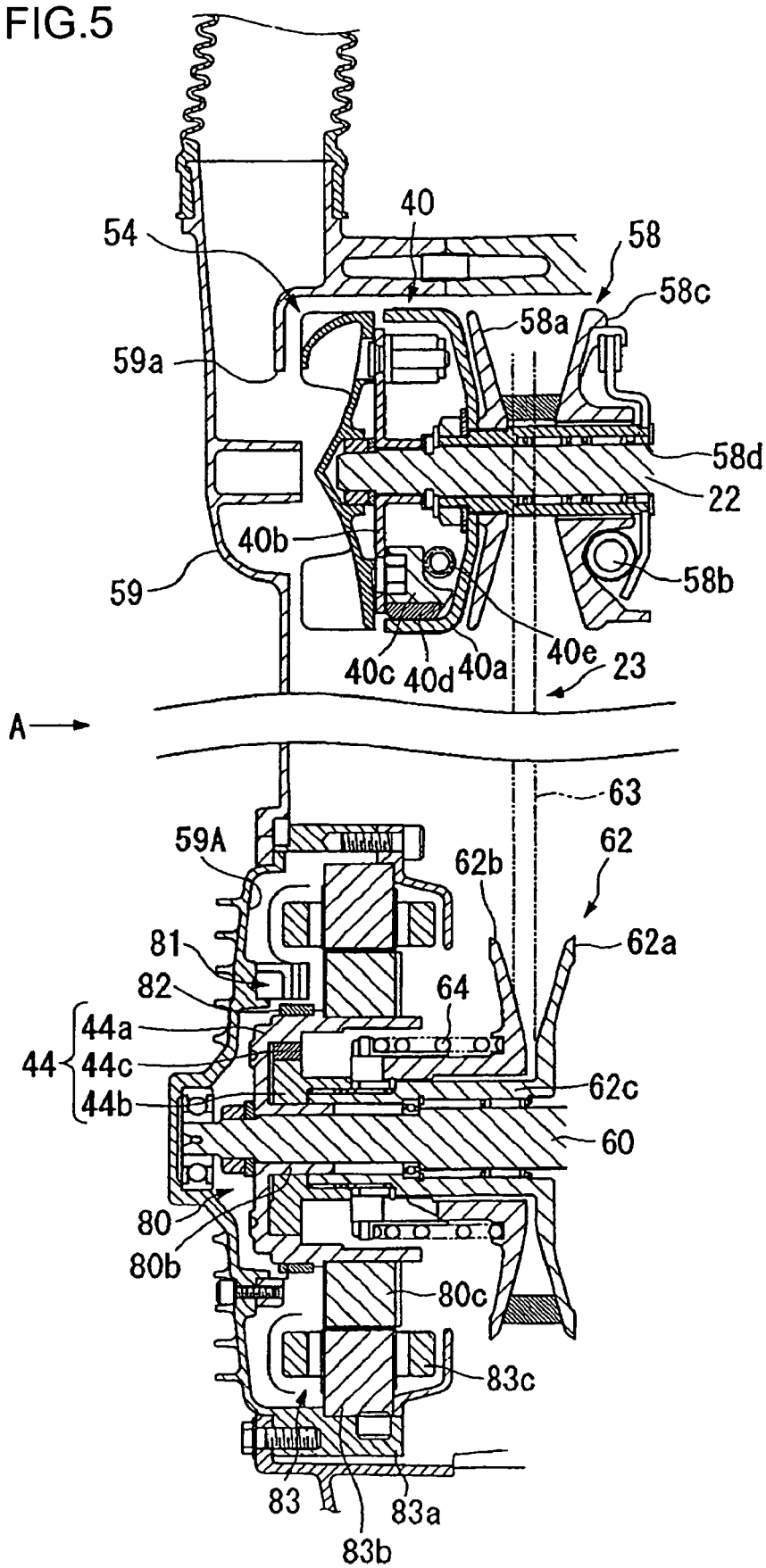
FIG. 5 is a partially enlarged view of FIG. 3.

As shown in an enlarged view of a principal portion of FIG. 5, the driving pulley 58 includes a driving fixed pulley half 58a mounted on the crank shaft 22 rotatably through a sleeve 58d and a driving movable pulley half 58c mounted on the sleeve 58d axially slidably and circumferentially unrotatably. A weight roller 58b for displacing the driving movable pulley half 58c toward the driving fixed pulley half 58a in accordance with a centrifugal force is attached to the pulley half 58c.

On the other hand, the driven pulley 62 includes a driven fixed pulley half 62a mounted on the driven shaft 60 axially unslidably and circumferentially rotatably and a driven movable pulley half 62b mounted axially slidably on a boss portion 62c of the driven fixed pulley half 62a. On a rear side (the left side in the vehicular width direction) of the driven movable pulley half 62b there is disposed a spring 64 which urges the driven movable pulley half 62b toward the driven fixed pulley half 62a constantly.

A belt groove having a generally V-shaped section is formed between the driving fixed pulley 58a and the driving movable pulley half 58c and is also formed between the driven fixed pulley half 62a and the driven movable pulley half 62b. The V belt 63 is wound around the respective belt grooves.

In the continuously variable transmission 23 constructed as above, when the number of revolutions of the crank shaft 22 increases, a centrifugal force acts on the weight roller 58b in the driving pulley 58 and the driving movable pulley half 58c slides toward the driving fixed pulley half 58a. The driving movable pulley half 58c approaches the driving fixed pulley half 58a by an amount corresponding to the distance of the sliding motion and the groove width of the driving pulley 58 decreases, so that the position of contact between the driving pulley 58 and the V belt 63 shifts radially outward of the driving pulley 58 and the entrainment diameter of the V belt 63 increases. Accordingly, in the driven pulley 62, the groove width defined by both driven fixed pulley half 62a and the driven movable pulley half 62b increases. That is, in accordance with the number of revolutions of the crank shaft 22, the entrainment diameter (transfer pitch diameter) of the V belt 63 changes continuously and the transmission gear ratio changes in an automatic and stepless manner.

The centrifugal clutch 40 is mounted on an end portion of the crank shaft 22 which end portion projects to the left side of the vehicle body from the driving fixed pulley half 58a in the continuously variable transmission 23. The centrifugal clutch 40 includes a cup-like outer case 40a fixed to the sleeve 58d, an inner plate 40b fixed to the left end portion of the crank shaft 22 extending through the outer case 40a, a shoe 40d attached to the inner plate 40b on the side facing the interior of the outer case 40a, the shoe 40d being mounted so as to face radially outward through the weight 40c, and a spring 40e which urges the shoe 40d radially inward. In this embodiment, the inner plate 40b, weight 40c and shoe 40d constitute an inner rotor of the centrifugal clutch 40, while the outer case 40a constitutes an outer rotor.

The centrifugal clutch 40 makes and breaks the transmission of power by adjusting the balance between the centrifugal force of the weight 40c and the biasing force of the spring 40e. When the rotational speed of the crank shaft is not higher than a predetermined value (e.g., 3000 rpm), the transmission of power is cut off by the biasing force of the spring 40e. Then, when the rotational speed of the crank shaft 22 exceeds the above predetermined value, the centrifugal force of the weight 40c overcomes the biasing force of the spring 40e and moves radially outward, whereby the shoe 40d is urged against the inner periphery surface of the outer case 40a. At this time, a frictional slide occurs between the shoe 40d and the outer case 40a and power is transmitted gradually. As a result, the rotation of the crank shaft 22 is transmitted to the sleeve 58d via the centrifugal clutch 40 and the driving pulley 58 fixed to the sleeve 58d is actuated.

The one-way clutch 44 includes a cup-like outer clutch 44a, an inner clutch 44b inserted coaxially into the outer clutch 44a, and a roller 44c which permits the transfer of power in only one direction from the inner clutch 44b to the outer clutch 44a. The outer clutch 44a also serves as an inner rotor body of the drive motor 21b and is constituted by the same member as the inner rotor body. The inner periphery of the inner clutch 44b and a left end portion of the boss portion 62c in the driven fixed pulley half 62a are splined to each other.

Thus, in the one-way clutch 44, the power of the engine 20 which has been transmitted to the driven pulley 62 in the continuously variable transmission 23 is transmitted to the rear wheel WR via the driven shaft 60 and the reduction mechanism 69. However, the power inputted from the rear wheel WR via the reduction mechanism 69 and the driven-shaft 60 is not transmitted to the continuously variable transmission 23. Therefore, when the rider walks while pushing the motorcycle or during regenerative operation, the power on the rear wheel WR merely causes the outer clutch 44a to race relative to the inner clutch 44b and is not transmitted to the continuously variable transmission 23 and the engine 20.

The reduction mechanism 69 includes an intermediate shaft 73 supported in parallel with the driven shaft 60 and the axle 68 of the rear wheel WR, a pair of first reduction gears 71 formed respectively on a right end portion of the driven shaft 60 and on a central part of the intermediate shaft 73, and a pair of second reduction gears 72 formed respectively on left end portions of the intermediate shaft 73 and the axle 68.

In the reduction mechanism 69, the rotation of the driven shaft 60 is reduced to a predetermined reduction ratio and is then transmitted to the axle 68 of the rear wheel WR which is supported in parallel with the reduction mechanism.

Figure 4:
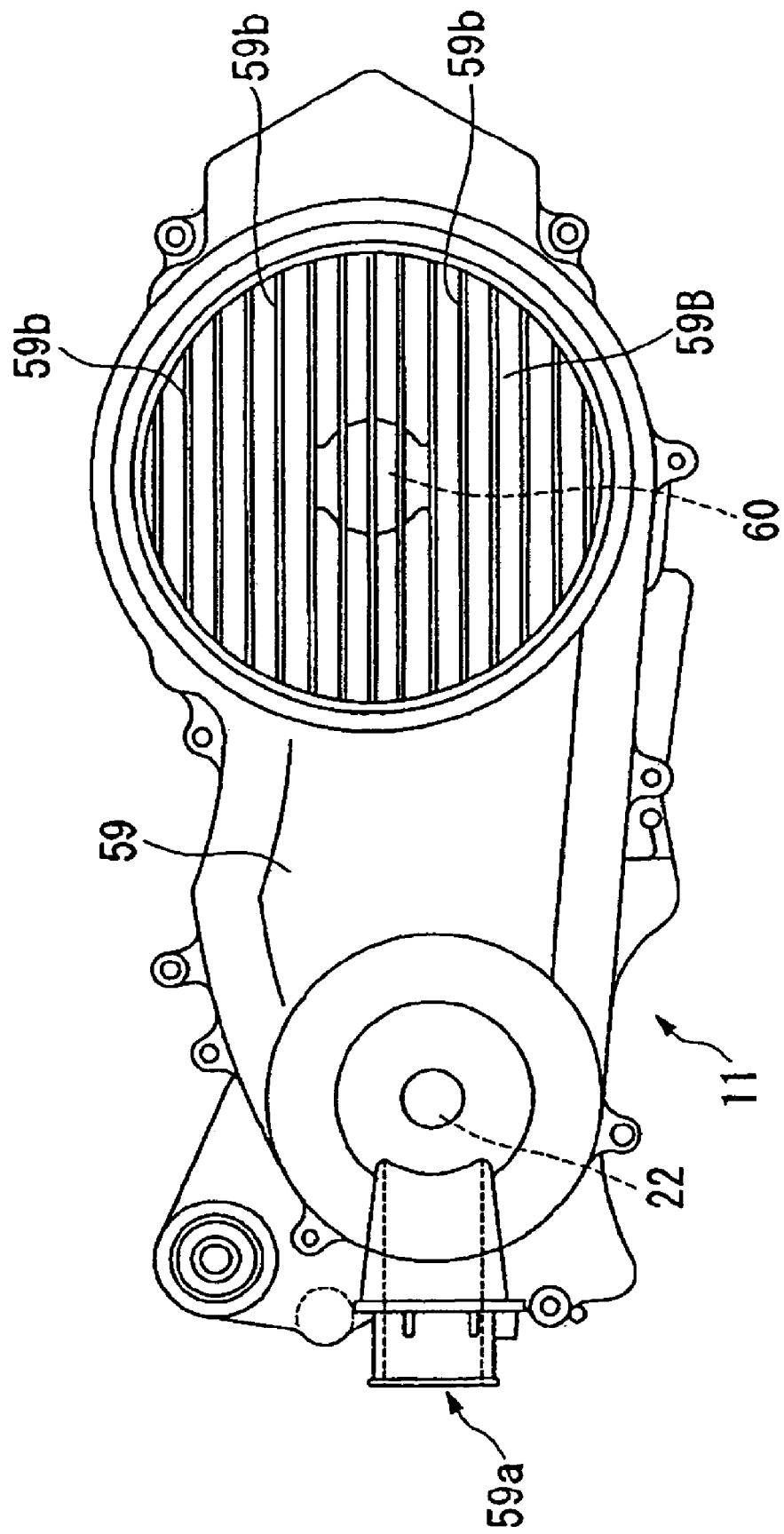
FIG. 4 is an enlarged view of the power unit of FIG. 1.

The drive motor 21b is an inner rotor type motor using the driven shaft 60 as a motor output shaft, and the inner clutch 44b described above constitutes an inner rotor body of an inner rotor 80. A stator 83 of the drive motor 21 is fixed through a stator case 83a to the inside of a metallic transmission case 59 which covers the centrifugal clutch 40 and the continuously variable transmission 23 sideways. The stator 83 is provided with teeth 83b with coil 83c wound thereon. As shown in FIG. 4, plural cooling fins 59b extending longitudinally of the vehicle body are formed spacedly from one another in an outer wall 59B of the transmission case 59 at a position corresponding to the directly installed position of the drive motor 21b. Heat which has been transferred to the transmission case 59 from the inside is released efficiently through the interior to the exterior of the vehicle.

The outer clutch 44a is formed in a cup shape and a boss portion 80b projected centrally of the outer clutch is splined to the driven shaft 60. A magnet 80c is mounted on an outer periphery surface on an opening side of the outer clutch 44a in an opposed relation to the teeth 83b. Plural subject pieces 82 to be sensed by a rotor sensor 81 attached to an inner wall 59A of the transmission case 59 are mounted to an outer periphery surface on a bottom side of the outer clutch 44a.

Figure 2:
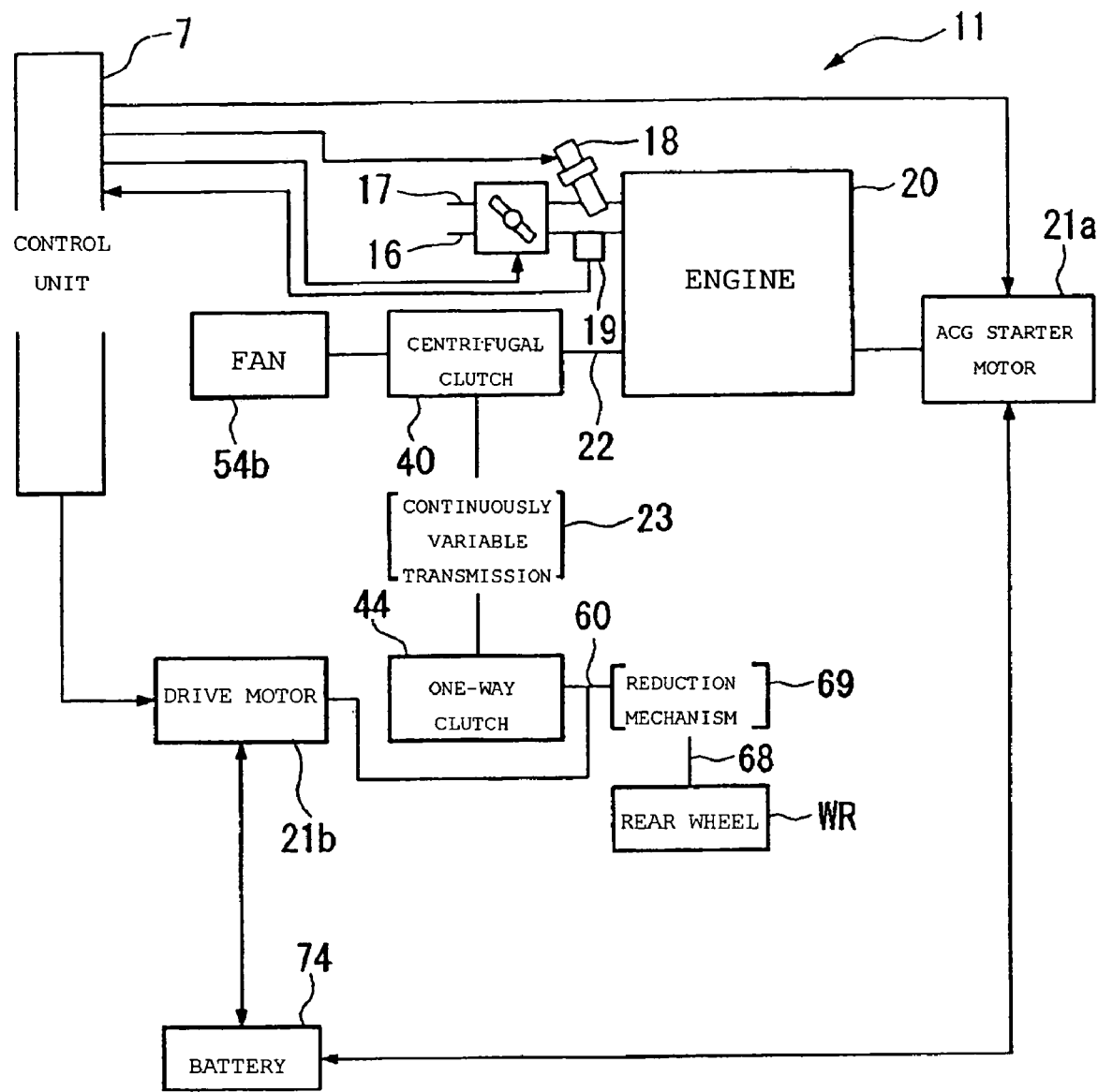
FIG. 2 is a block diagram showing a system configuration of the motorcycle of FIG. 1.

The drive motor 21b constructed as above not only functions as a motor at the time of assisting the output of the engine 20 but also functions as a generator which converts the rotation of the driven shaft 60 into electric energy and which charges the regenerative power to the battery 74 (not shown in FIG. 2).

In the power unit 11 described above, a casing of the entire unit is constituted by the crank case 48 which encloses the crank shaft 22 of the engine, the stator case 83a which encloses the ACG starter motor 21a, the transmission case 59 which encloses the centrifugal clutch 40 and the continuously variable transmission 23 sideways, and a reduction gear case 70 which encloses the reduction mechanism 69. In this case, as shown in FIGS. 3 and 5, a cooling air intake port 59a is formed in a front end portion of the transmission case 59 so as to axially face an end face of the crank shaft 22, and the centrifugal fan 54 is coaxially connected with bolt 85 to the inner plate 40b of the centrifugal clutch 40 so as to be opposed to the intake port 59a. The inner plate 40b is a portion which constitutes a rotary shaft of the centrifugal clutch 40 at an end portion of the crank shaft 22, and the centrifugal fan 54 fixed to the inner plate 40b is disposed axially in series on a front side of the centrifugal clutch 40. In this embodiment, the centrifugal fan 54 and the intake port 59a mainly constitute the cooling device for the power unit, and the centrifugal clutch constitutes a heat-generating rotating device in the invention.

Figure 6:
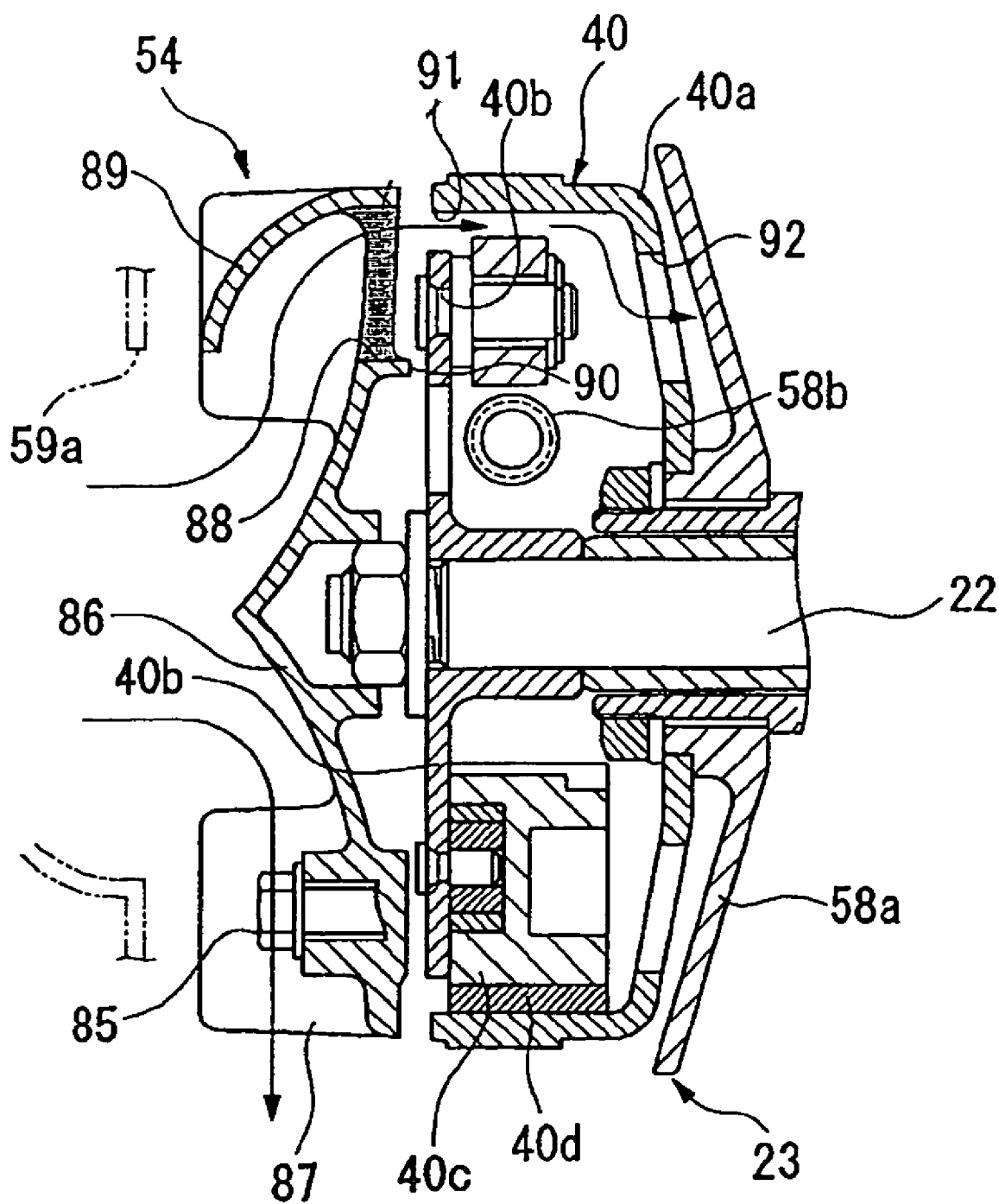
FIG. 6 is an enlarged sectional view showing a principal portion of the embodiment.
Figure 7:
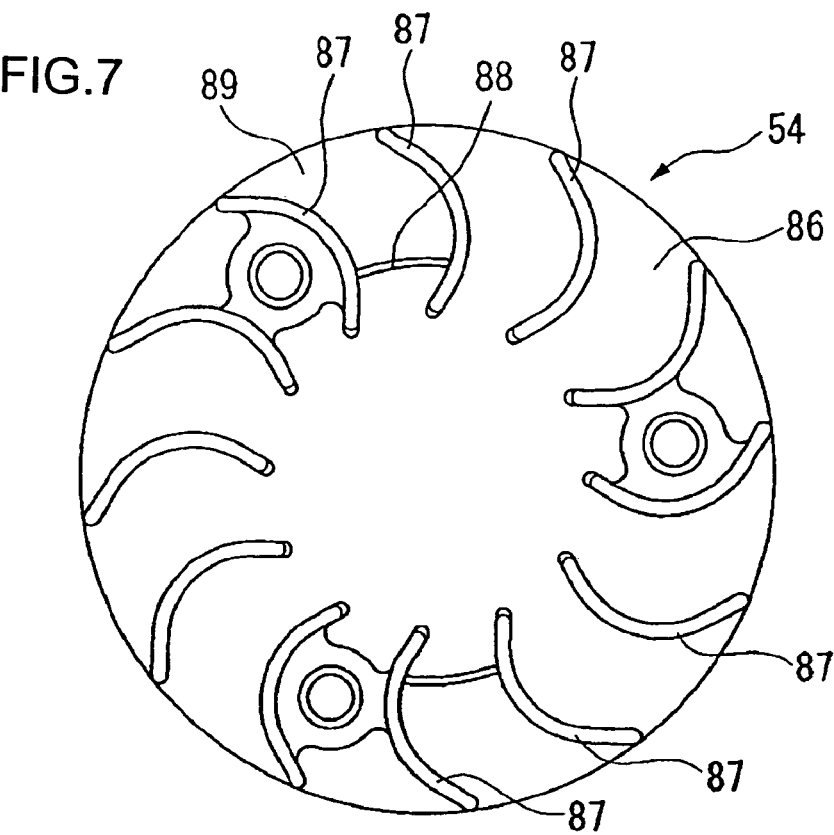
FIG. 7 is a front view of a centrifugal fan shown in FIG. 6.

The centrifugal fan 54 is for cooling the continuously variable transmission 23, drive motor 21b and centrifugal clutch 40 disposed within the transmission case 59 (casing). As shown in detail in FIGS. 6 to 8, the centrifugal fan 54 includes a generally disc-like base plate 86 which is connected with bolt 85 to the inner plate 40b of the centrifugal clutch 40, and plural fins 87 formed on an outer periphery edge portion on a front side (the side facing the intake port 59a) of the base plate 86. With rotation of the base plate 86 in the same direction as the crank shaft 22, the fins 87 flows off air radially outward. This is a basic construction. More specifically, the base plate 86 is gently tapered so that the central part thereof rises to the front side, and the fins 87 are formed in a predetermined curved shape so that the air from the intake port 59a which has been introduced into the central part with the aforesaid rotation of the base plate 86 is blown off radially outward by the centrifugal action.

Figure 8:
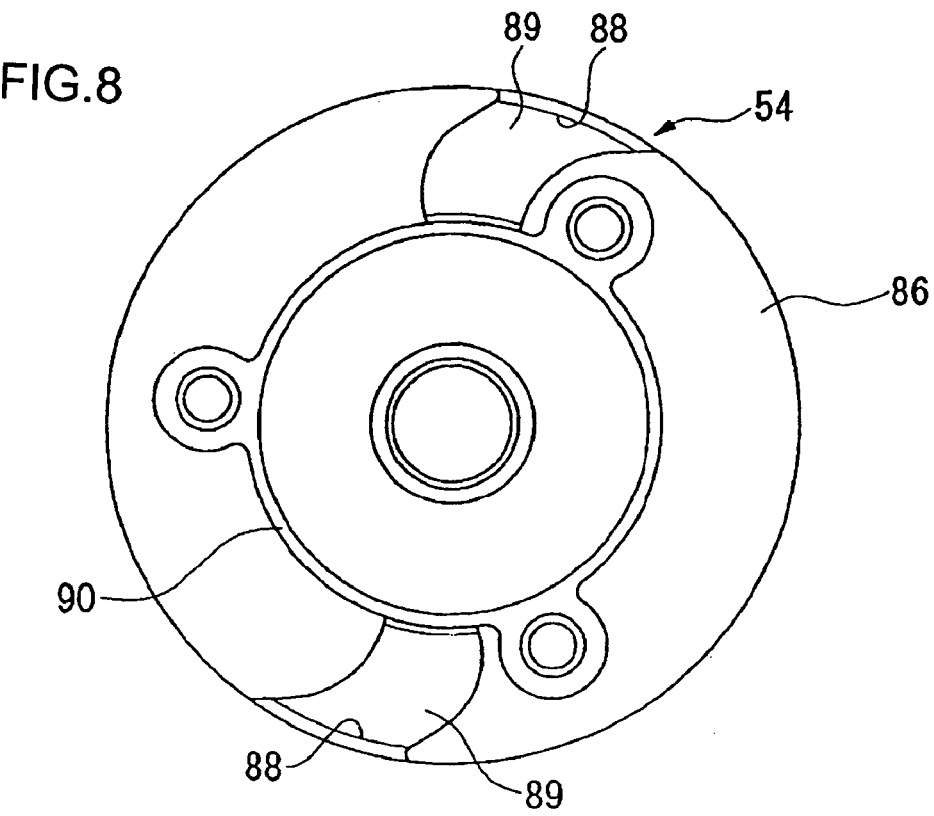
FIG. 8 is a rear view of a centrifugal fan shown in FIG. 6.

In the base plate 86 are formed two blow-off holes 88 extending axially through the base plate 86. Each blow-off hole 88 is formed between a pair of adjacent fins 87 on the base plate 86 and both blow-off holes 88 are formed in symmetric positions with respect to the center of rotation of the base plate 86. On the front side of the base plate 86 and between the fins 87 where each blow-off hole 88 is present there is formed a guide wall 89 for guiding air into the blow-off hole 88 after blown off radially outward by the fin 87. The guide wall 89 straddles adjacent fins 87 and is gently curved and is contiguous to an outer periphery end of the base plate 86. On the rear side of the base plate 86, as shown in FIG. 8, a cylindrical wall 90 is formed to restrict the flow of air which is radially inward with respect to the blow-off holes 88.

In this embodiment, the blow-off holes 88 and the guide walls 89 constitute a flow dividing mechanism in the centrifugal fan 54.

In the centrifugal clutch 40, a relatively large gap 91 is formed between the opening of the cup-like outer case 40a and the disc-like inner plate 40b. The gap 91 serves as an inlet port (the "gap 91" will hereinafter be referred to as "inlet port 91") for conducting the air blown off from the blow-off holes 88 of the centrifugal fan 54 into the clutch. In a substantially radially extending bottom wall of the outer case 40a there is formed a discharge port 92 extending axially through the bottom wall. The discharge port 92 is for discharging air introduced into the clutch to the exterior of the clutch at a position opposed to the inlet side.

In the power unit cooling device of this embodiment, when the crank shaft rotates with operation of the engine 20, the centrifugal fan 54 rotates together with the inner plate 40b of the centrifugal clutch 40 and at this time the air introduced from the intake port 59a is blown off radially outward by the centrifugal action of the fins 87 of the centrifugal fan 54. At the same time, a portion of the air is guided by the guide walls 89 on the base plate 86 and is blown off to the rear side from the blow-off holes 88. At this time, the air blown off radially outward from the centrifugal fan 54 is fed in a direction substantially perpendicular to the crank shaft 22 within the casing, mainly within the transmission case 59, to cool the whole of the interior of the casing, mainly the continuously variable transmission 23 and the drive motor 21b.

On the other hand, the air which has been blown off from the centrifugal fan axially to the rear side through the base plate 86 is directly blown against the centrifugal clutch 40 to cool the interior of the casing, mainly the centrifugal clutch 40. However, since the blow-off holes 88 of the centrifugal fan 54 are opposed to the inlet port 91 of the centrifugal clutch 40, the air blown off from the blow-off holes 88 mainly passes through the inlet port 91 and enters the interior of the clutch. The air thus admitted into the clutch flows along an inner periphery surface of the outer case 40a which is a contact surface of the shoe 40d and is then discharged to the exterior of the clutch from the discharge port 92 of the outer case 40a.

Thus, according to the cooling device of this embodiment, the outside air just after introduced from the intake port 59a can be blown against the centrifugal clutch 40 behind the centrifugal fan 54 by virtue of a flow dividing action induced by both guide walls 89 and blow-off holes 88 in the centrifugal fan 54, so that the centrifugal clutch 40 disposed on the crank shaft 22 can be cooled efficiently. Particularly, in the case where the centrifugal clutch 40 is disposed on the crank shaft 22, it is difficult to ensure a sufficient heat capacity of the clutch due to the layout concerned. In this embodiment, however, since the centrifugal clutch 40 can be cooled efficiently as described above, it is possible to surely prevent overheating of the centrifugal clutch 40 even if the heat capacity is not set so large.

According to this embodiment, moreover, the air flow advancing radially outward can be divided to the rear side of the centrifugal fan 54 by an extremely simple construction wherein the blow-off holes 88 and the guide walls 89 are formed on the base plate 86. Consequently, there accrues an advantage that it is possible to attain the reduction in size of the device and reduction of the manufacturing cost.

In the cooling device of this embodiment, since the inlet port 91 and the discharge port 92 are formed in the centrifugal clutch 40 disposed behind the centrifugal fan 54 and the blow-off holes 88 of the centrifugal fan 54 are formed in opposition to the inlet port 91, the air for cooling can be allowed to flow smoothly through the interior of the clutch. Particularly, in this embodiment, since a relatively large gap present between the outer case 40a and the inner plate 40b is used as the inlet port 91 and an air flow is blown through the inlet port 91 against the slide surface present between the shoe 40d and the outer case 40a, not only the source of frictional heat can be cooled efficiently, but also the wear dust created in the interior of the clutch can be discharged to the exterior of the clutch by the air flow.

In the cooling device of this embodiment, since the centrifugal fan 54 is mounted to the inner plate 40b which is an input-side member of the centrifugal clutch 40, the centrifugal clutch 40 and the continuously variable transmission 23 can be surely cooled by the centrifugal fan 54 even during idling during which the transfer of power from the engine 20 to the continuously variable transmission 23 is cut off by the centrifugal clutch 40.

The hybrid vehicle operates in the following manner. At the time of start-up of the engine, the crank shaft 22 is rotated using the ACG starter motor 21a on the crank shaft 22. At this time, the centrifugal clutch 40 is not engaged, so that the transfer of power from the crank shaft 22 to the continuously variable transmission 23 is cut off. The air-fuel mixture introduced into the cylinder 27 in synchronism with rotation of the crank shaft 22 is burned with the spark plug to let the piston 25 reciprocate.

When the number of revolutions of the crank shaft 22 exceeds a predetermined value (e.g., 3000 rpm) in accordance with the amount of operation of the throttle grip, the rotating power of the crank shaft 22 is transmitted through the centrifugal clutch 40 to the continuously variable transmission 23, one-way clutch 44 and reduction mechanism 69, whereby the rear wheel WR is rotated.

In this starting operation, it is also possible to let the drive motor 21b operate by the supply of electric power from the battery 74 to assist the rotation of the driven shaft 60 which is caused by the engine power.

The starting by the engine 20 can be substituted by starting with only the drive motor 21b. In this case, since the rotation of the driven shaft 60 by the drive motor 21b is not transmitted to the driven pulley 62 in the presence of the one-way clutch 44, the continuously variable transmission 23 is not operated. As a result, the energy transfer efficiency is improved in the case where the rear wheel WR is rotated by only the drive motor 21b.

When the vehicle is running with the engine 20 alone and when the load is large such as during acceleration or high-speed running, the vehicle running by the engine can be assisted by the drive motor 21b. At this time, the rotating power of the crank shaft 22 induced by the reciprocating motion of the piston 25 is transmitted to the driven shaft 60 via the centrifugal clutch 40, continuously variable transmission 23 and one-way clutch 44, and the power from the drive motor 21b is also transmitted to the driven shaft 60. A combined power of both powers causes the rear wheel WR to rotate via the reduction mechanism 69.

Conversely, when the vehicle is running by only the drive motor 21b, the vehicle running by the motor can be assisted by the engine 20.

When the vehicle is running at a constant speed (cruising) using only the drive motor 21b as a power source, even if the engine 20 is operated, if the number of revolutions is not larger than the number of revolutions (the above predetermined value) corresponding to engagement of the centrifugal clutch 40, the generation of power can be done by the ACG starter motor 21a without operation of the continuously variable transmission 23.

When this constant-speed travel is performed using the drive motor 21b alone as a power source, the transfer of power from the drive motor 21b to the rear wheel WR is conducted without operation of the continuously variable transmission 23, and thus there is attained a high energy transfer efficiency.

During deceleration, the one-way clutch 44 does not transmit the rotation of the driven shaft 60 to the driven pulley 62 in the continuously variable transmission 23, so that the rotation of the axle 68 can be returned directly to the drive motor 21b via the reduction mechanism 69 without causing operation of the continuously variable transmission 23.

That is, at the time of regenerative operation from the rear wheel WR to the drive motor 21b, the power transmitted from the rear wheel WR to the drive motor 21b is not consumed for operation of the continuously variable transmission, so that the charging efficiency in regeneration is improved.

The present invention is not limited to the above embodiment, but various design changes may be made within the scope not departing from the gist of the invention. For example, although in the above embodiment the centrifugal fan 54 having the flow dividing mechanism is mounted on the rotary shaft (inner plate 40b) of the centrifugal clutch 40 which is a heat-generating rotating device, the centrifugal fan 54 having the flow dividing mechanism may be mounted on the rotary shaft of the drive motor 21b as another heat-generating rotating device and the outside air just after admitted from the intake port 59a may be blown against the drive motor 21b as an air flow advancing in the axial direction of the centrifugal fan 54. Of course, the heat-generating rotating devices for mounting the centrifugal fan 54 thereto are not limited to those referred to above, but may be power transfer parts.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A power unit cooling device for a power unit having a power source and a power transmission mechanism disposed within a casing of the power unit, comprising:
   a centrifugal fan having a front side and a rear side, disposed within the casing and configured so that air introduced from the front side of the centrifugal fan is allowed to flow through an interior of the casing by a blow-off action of the centrifugal fan;
   wherein the centrifugal fan is mounted on a rotary shaft of a heat generating rotating device that generates heat during operation;
   a flow dividing mechanism connected to the centrifugal fan for dividing a part of an air flow to be blown off radially outwardly and a part of an air flow to be blown off axially towards the rear side of the centrifugal fan; and
   the centrifugal fan includes:
   a base plate integrally connected to the rotary shaft of the heat-generating rotating device;
   a plurality of fins on an outer periphery edge portion of the base plate;
   a blow-off hole penetrating axially through the base plate between a pair of adjacent fins; and
   a guide wall disposed between the adjacent fins to conduct air flowing radially outward over the base plate into the blow-off hole;
   wherein the heat generating rotating device is a centrifugal clutch that transmits a rotating power to an outer rotor that is connected to a driven side of the clutch when the number of revolutions of an inner rotor connected to the power source has reached a predetermined number of revolutions;
   wherein the centrifugal clutch includes an inlet port for conducting air blown-off axially towards the rear side of the centrifugal fan into an interior of the centrifugal clutch; and a discharge port for discharging the air from the interior of the centrifugal clutch to an exterior of the centrifugal clutch;
   wherein the centrifugal clutch is interposed between an input side of the power transmission mechanism, which is for transmitting engine power to a driving wheel, and an engine crank shaft the centrifugal fan being mounted on an input side of the centrifugal clutch, and wherein the air blown off radially outward by the centrifugal fan is fed to the interior of the casing, while the air flowing axially backward as a divided air flow from the centrifugal fan is fed to the interior of the centrifugal clutch.

2. A power unit cooling device according to claim 1, wherein the power transmission mechanism is a belt type continuously variable transmission.

3. A power unit cooling device for a motor vehicle, comprising:
   a casing configured to house a heat generating rotating device, wherein the heat generating rotating device includes a rotary shaft;
   a centrifugal fan disposed within the casing wherein the centrifugal fan includes:
   a base plate connected to the rotary shaft of the heat-generating rotating device;
   a plurality of fins disposed on an outer periphery edge portion of the base plate;
   a blow-off hole penetrating axially through the base plate between a pair of adjacent fins; and
   a means for directing air flow from a front side of the fan radially outward over the base plate and axially through the blow-off hole, wherein the means is connected to the front side of the fan and disposed between the pair of adjacent fins;
   wherein the heat generating rotating device is a centrifugal clutch that transmits a rotating power to an outer rotor that is connected to a driven side of the centrifugal clutch when a number of revolutions of an inner rotor connected to a power source has reached a predetermined number of revolutions;
   wherein the centrifugal clutch is interposed between an engine crank shaft and an input side of a transmission, wherein the centrifugal fan is mounted on an input side of the centrifugal clutch such that air directed radially is fed to an interior of die casing while air directed axially is fed to an interior of the centrifugal clutch.

4. A power unit cooling device according to claim 3, wherein the transmission is a belt type continuously variable transmission.

* * * * *